United States Patent Office 3,115,794
Patented Dec. 31, 1963

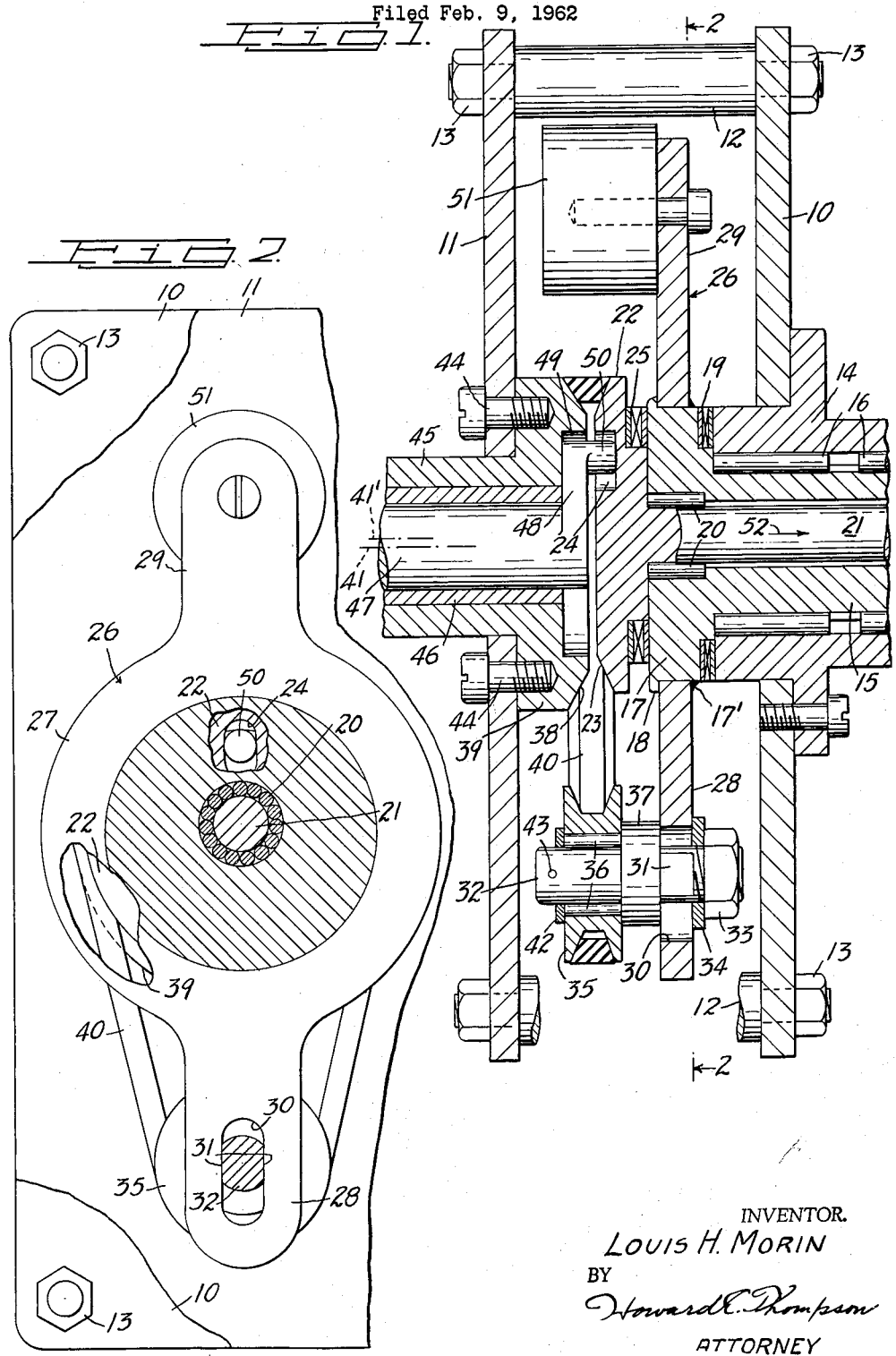

3,115,794
V-BELT SPEED REDUCER
Louis H. Morin, Bronx, N.Y.
(125 Beechwood Ave., New Rochelle, N.Y.)
Filed Feb. 9, 1962, Ser. No. 172,313
10 Claims. (Cl. 74—797)

This invention relates to speed reducers employing belts for transmitting the drive between rotatable members of the reducer in materially reducing the drive from a drive shaft to a driven shaft. More particularly, the invention deals with a reducer of the character described employing a stationary sheave half and a rotatable sheave half cooperating in control of the reduction drive of the driven shaft through a crank on the driven shaft operatively engaging said rotatable sheave.

Still more particularly, the invention deals with a reducer including a crossarm directly driven by the drive shaft, said crossarm adjustably supporting an idler pulley at one end and a counterweight at its opposed end.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic sectional view through a speed reducer made according to my invention, with parts of the construction shown in elevation and parts broken away; and FIG. 2 is a section on the line 2—2 of FIG. 1, with parts of the construction broken away, parts shown in elevation and omitting one side portion of the reducer.

In the drawing, I have diagrammatically illustrated one adaptation of my invention and, considering FIG. 1 of the drawing, it will appear that the reducer comprises two side plates or frames 10 and 11, generally rectangular in form and secured together and spaced apart at corner portions by rods 12, having reduced threaded ends upon which nuts 13 are arranged. Mounted in the central portion of the plate 10 and secured to said plate is a flanged bearing 14, in which is rotatably mounted a drive member 15, the member 15 operating on spaced roller bearings 16, part of which only are shown. The bearing 14 projects through the inner surface of the plate 10 and the member 15 projects beyond the bearing and has an annular enlarged portion 17 including, at its inner end, a projecting annular flange 18. Arranged between adjacent surfaces of the enlarged portion 17 and the inner end of the bearing 14 is a suitable thrust bearing, diagrammatically shown at 19.

The drive member 15 is tubular in form and the inner end of the bore of said member supports a roller bearing 20, in which the shaft 21 of a sheave half 22 of a pulley is rotatably mounted. 23 designates the bevelled inner surface of 22 and the body portion of 22 inwardly of the bevel 23 has a radially arranged slot 24, part of the structure of FIG. 2 being broken away to further illustrate this slot. Between 22 and the inner end of the enlarged portion 17 is another thrust bearing 25, as diagrammatically seen, and these thrust bearings, 19 and 25, are of the needle bearing type.

Abutting the flange 18 and welded to the enlarged portion 17, as diagrammatically seen at 17' in FIG. 1 of the drawing, is a crossarm 26, comprising a round ring portion 27, as clearly seen in FIG. 2 of the drawing, with opposed extending arms 28 and 29. The arm 28 has an elongated slot 30 therein adapted to receive the flattened sides 31 of a stud 32, note FIG. 2. One end of the stud is threaded to receive a nut 33 which bears upon a washer 34, as seen in FIG. 1. The other end of the stud has an idler pulley 35 with a roller bearing mounting on the stud 32, as diagrammatically seen at 36 in FIG. 1. The stud includes a bushing 37 spacing the pulley 35 from the arm 28 and in alining the idler pulley centrally with respect to the inner bevelled surface 23 of 22 and the inner bevelled surface 38 of the companion sheave half 39 which, in conjunction with the sheave half 22, forms the pulley structure engaged by the V-belt 40. It will appear that the sheave half 39 is of larger diameter than the sheave half 22. Here, it is to be noted that the axis of the sheave half 39 is diagrammatically shown by the dot-dash line 41; whereas, the axis of the sheave half 22, including its shaft 21, is offset or eccentric to the axis 41 and this latter axis is indicated by the dot-dash line 41', both of these axes being shown at the left of FIG. 1.

Returning now to the idler pulley 35, it will appear that the pulley is retained on the stud 32 by a washer 42 held in place by a pin 43 fixed to the stud.

The sheave half 39 is fixed to the plate 11, as indicated by the screws 44. 39 has a sleeve portion 45 projecting through the plate 11 and in the sleeve portion is a plain bearing 46, in which the driven shaft or member 47 is rotatably mounted. The member 47 has, at its inner end, a crank 48 operating in an annular recess 49 in the inner surface of 39, the crank 48 having a projecting pin 50 which operates in the slot 24 of the sheave half 22, as clearly noted in FIG. 1 of the drawing.

The arm extension 29 of the crossarm 26 supports a counterweight 51 to counterbalance the pulley and associate parts of the arm 28, as will be apparent. In rotation of the drive member 15 in one direction, the crossarm fixed thereto will rotate to move the idler pulley 35, including the belt 40, around the fixed sheave half 39, the belt being supported at all times in tensional engagement with both of the surfaces 23, 38 of the sheave halves and, as a result of this operation, it will be apparent that a materially reduced rotation of the sheave half 22 with respect to rotation of the drive member 15 will take place and this differential will be transmitted to the driven shaft or member 47 in a direction opposed to rotation of 15 through engagement of 22 with the pin 50 of the crank 48. It will be understood that the stud 32 is adjustably supported in the crossarm to maintain the belt 40 in constant tensional engagement with the two sheave halves 22, 39 at all times as the idler pulley 35 is rotated about the fixed sheave half 39. The speed reduction of the drive between 15 and 47 will be controlled by variance in the comparative sizes or diameters of 22 and 39, respectively.

In the aforesaid operation, it will be understood that the belt develops a strain radially with respect to the axes of 15 and 47 and this strain reflects in a counterforce exerted in the direction of the arrow 52 of FIG. 1 and this latter force, or thrust, is taken up by the bearings 19 and 25, respectively. It will also be apparent that the axis of the drive member is common with the axis of the driven member or, in other words, is on the axis line 41. Thus, the shaft 21, including the rotatable sheave half 22, is eccentrically disposed in the drive member. It is also pointed out, at this time, that, while one bearing 20 only is shown, other similar bearings may be provided in the drive member for further support of the shaft 21.

By way of explanation, it is pointed out that, when the diameter of the sheave half 22 is increased, the ratio also increases. In other words, if 22 were made but a few thousandths less in diameter than the diameter of 39, the ratio would be in the nature of many thousandths. On the other hand, if 22 were made larger in diameter than 39, then the output rotation of the driven shaft or member 47 would be in the same direction as the drive member 15. Here again, if 22 were made but a few thousandths larger in diameter than 39, the ratio would again be extremely high.

Having fully described my invention, what I claim as new and desire to secure by Letters Patent is:

1. A speed reducer of the character defined comprising a supporting frame having spaced plates, a drive member freely rotatable in one of said plates, a driven member freely rotatable in the other of said plates, a crossarm fixed to the drive member within and between said plates, one end of the cross arm having means adjustably supporting an idler pulley, a fixed sheave half secured to the second named plate and in which said driven member is rotatable, a companion rotatable sheave half freely rotatable in said drive member and arranged adjacent said fixed sheave half, said sheave halves having inner adjacent bevelled surfaces in alignment with said idler pulley, a V-belt operatively engaging the bevelled surfaces of both of said sheave halves and said alined idler pulley, said fixed sheave half being of greater diameter than said rotatable sheave half, and said rotatable sheave half and driven member having interengaging relatively movable means for transmitting the drive of the rotatable sheave half to said driven member in the drive of the crossarm by said drive member to rotate the idler pulley around said sheave halves.

2. A speed reducer as defined in claim 1, wherein said last named means comprises a crank portion on the driven member operating in a recessed surface of said rotatable sheave half.

3. A speed reducer as defined in claim 1, wherein the first named plate includes a bearing in which the drive member is rotatable, and thrust bearings arranged between adjacent surfaces of the drive member and said bearing and between said drive member and rotatable sheave half.

4. A speed reducer as defined in claim 2, wherein the crank portion of the driven member operates in a recess on the surface of said fixed sheave arranged adjacent said rotatable sheave.

5. A speed reducer as defined in claim 1, wherein said first named means includes a stud keyed to and adjustable radially of said crossarm, and means for clamping the stud on said crossarm.

6. A speed reducer as defined in claim 5, wherein the opposed end of the crossarm supports a counterweight.

7. A speed reducer as defined in claim 5, wherein said idler pulley has a free bearing support on said stud.

8. A speed reducer as defined in claim 7, wherein said stud includes means spacing the idler pulley from said crossarm and alining said pulley with respect to adjacent bevelled surfaces of said fixed and rotatable sheaves.

9. In speed reducers, a drive member, a driven member in axial alinement with said drive member, a two-part pulley structure, one part comprising a fixed sheave half and the other part comprising a rotatable sheave half, said rotatable sheave half having an axis eccentric to the axis of said drive member, an idler pulley spaced radially from and alined with said two-part pulley structure, a V-belt operatively engaging said idler pulley and tensionally engaging both sheave halves of said two-part pulley structure, said drive member including means for rotating said idler pulley around said two-part pulley structure, one sheave half being of greater diameter than the other sheave half, and interengaging means between the driven member and said rotatable sheave half for transmitting a drive to the driven member by said drive member at a speed materially reduced with respect to the speed of rotation of the drive member.

10. A speed reducer as defined in claim 9, wherein means is employed for adjustably supporting said idler pulley in controlling tensional engagement of the V-belt with said fixed and rotatable sheave halves.

References Cited in the file of this patent

UNITED STATES PATENTS

| | | |
|---|---|---|
| 381,371 | Heller | Apr. 17, 1888 |
| 630,833 | Johnston | Aug. 8, 1899 |
| 1,828,136 | Freedlander | Oct. 20, 1931 |
| 3,094,884 | Morin | June 25, 1963 |